(12) United States Patent
Shin et al.

(10) Patent No.: US 11,606,001 B2
(45) Date of Patent: Mar. 14, 2023

(54) MOTOR ASSEMBLY, METHOD OF MANUFACTURING THE SAME AND A CLEANER HAVING THE SAME

(71) Applicant: Samsung Electronics Co., Ltd., Suwon-si (KR)

(72) Inventors: Sangmo Shin, Suwon-si (KR); Wonsoo Kang, Suwon-si (KR); Jimin Kim, Suwon-si (KR); Taesang Park, Suwon-si (KR); Jihoon Han, Suwon-si (KR); Jinwoo Han, Suwon-si (KR); Woong Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 16/716,887

(22) Filed: Dec. 17, 2019

(65) Prior Publication Data
US 2020/0204034 A1    Jun. 25, 2020

(30) Foreign Application Priority Data
Dec. 21, 2018 (KR) .......................... 10-2018-0167223

(51) Int. Cl.
*H02K 1/14* (2006.01)
*H02K 3/34* (2006.01)
(Continued)

(52) U.S. Cl.
CPC .................. *H02K 5/24* (2013.01); *A47L 9/22* (2013.01); *A47L 9/28* (2013.01); *H02K 1/146* (2013.01);
(Continued)

(58) Field of Classification Search
CPC ........ H02K 15/10; H02K 15/008; H02K 5/24; H02K 1/146; H02K 3/34; H02K 3/522;
(Continued)

(56) References Cited

U.S. PATENT DOCUMENTS 6,888,284 B2    5/2005  Eggers et al.
7,851,966 B2 *  12/2010 Rippel ................... H02K 9/223
                                                    310/215
(Continued)

FOREIGN PATENT DOCUMENTS

CN           206962547 U     2/2018
CN           207542908 U     6/2018
(Continued)

OTHER PUBLICATIONS

Korean Office Action with English translation dated Jun. 19, 2019; Korean Appln. No. 10-2018-0167223.
(Continued)

*Primary Examiner* — Burton S Mullins
(74) *Attorney, Agent, or Firm* — Jefferson IP Law, LLP

(57) ABSTRACT

A motor is provided that reduces noise and vibration, and a method is provided for manufacturing the motor and a cleaner having the motor. The motor includes a stator including a plurality of teeth that are spaced apart from each other in a predetermined interval in a circumferential direction and a coil that is wound around the plurality of teeth, a rotor that is disposed inside the stator, and a cage that is disposed in at least one of a plurality of slots that are formed between the plurality of teeth. The cage is configured to include a flow path to inject a bonding agent into at least one slot.

18 Claims, 15 Drawing Sheets

(51) Int. Cl.
  *H02K 3/52* (2006.01)
  *H02K 15/095* (2006.01)
  *H02K 15/10* (2006.01)
  *A47L 9/22* (2006.01)
  *H02K 5/24* (2006.01)
  *A47L 9/28* (2006.01)
  *A47L 5/28* (2006.01)

(52) U.S. Cl.
  CPC ............... *H02K 3/34* (2013.01); *H02K 3/522* (2013.01); *H02K 15/095* (2013.01); *A47L 5/28* (2013.01)

(58) Field of Classification Search
  CPC . H02K 15/095; A47L 9/22; A47L 9/28; A47L 5/28
  See application file for complete search history.

(56) References Cited

U.S. PATENT DOCUMENTS

| | | | |
|---|---|---|---|
| 8,008,832 | B2 | 8/2011 | Rhode |
| 10,284,045 | B2 | 5/2019 | Li et al. |
| 10,411,529 | B2 * | 9/2019 | Matsumoto ............... H02K 3/34 |
| 10,512,380 | B2 * | 12/2019 | Park .................... F04D 25/0606 |
| 2002/0135259 | A1 | 9/2002 | Eggers et al. |
| 2009/0134742 | A1 | 5/2009 | Rhode |
| 2014/0159539 | A1 * | 6/2014 | Iwase .................... H02K 3/345 310/215 |
| 2016/0226320 | A1 | 8/2016 | Li et al. |
| 2016/0226322 | A1 | 8/2016 | Li et al. |
| 2016/0226330 | A1 | 8/2016 | Li et al. |
| 2017/0284833 | A1 | 10/2017 | Abe et al. |

FOREIGN PATENT DOCUMENTS

| | | | | |
|---|---|---|---|---|
| CN | 208062922 U | | 11/2018 | |
| JP | H09-56121 A | | 2/1997 | |
| JP | 3936534 B2 | | 6/2007 | |
| JP | 2009-148081 A | | 7/2009 | |
| JP | 4339027 B2 * | | 10/2009 | ............... H02K 3/46 |
| JP | 2011-130566 A | | 6/2011 | |
| JP | 2014-070990 A | | 4/2014 | |
| JP | 2017-112721 A | | 6/2017 | |
| KR | 10-2015-0140200 A | | 12/2015 | |
| KR | 10-2016-0094329 A | | 8/2016 | |
| KR | 10-2019-0127044 A | | 11/2019 | |
| WO | 01/91266 A1 | | 11/2001 | |
| WO | 2007/048567 A1 | | 5/2007 | |

OTHER PUBLICATIONS

International Search Report with Written Opinion dated Apr. 16, 2020; International Appln. No. PCT/KR2019/018100.
European Search Report dated Nov. 16, 2021; European Appln. No. 19899094.7-1201 / 3868003 PCT/KR2019018100.

* cited by examiner (a)

(b)

MOTOR ASSEMBLY, METHOD OF MANUFACTURING THE SAME AND A CLEANER HAVING THE SAME

CROSS-REFERENCE TO RELATED APPLICATION(S)

This application is based on and claims priority under 35 U.S.C. § 119(a) of a Korean patent application number 10-2018-0167223, filed on Dec. 21, 2018, in the Korean Intellectual Property Office, the disclosure of which is incorporated by reference herein in its entirety.

BACKGROUND

1. Field

The disclosure relates to a motor that is improved to reduce noise and vibration, a manufacturing method, and a cleaner having the same.

2. Description of Related Art

Generally, a cleaner is a device that creates a vacuum to suck or otherwise vacuum air from a surface to be cleaned, separates dust or contaminants from the vacuumed air, collects the separated dust or contaminants, and discharges purified air to the outside of a main body.

The cleaner may be classified into a canister type cleaner, an upright type cleaner, a handy cleaner, a stick type cleaner, or the like, depending on the type of cleaner.

The cleaner may include a motor driven to generate a suction force. The vibration and noise generated by the motor may be transferred to the outside of the cleaner body. The vibration and noise transferred to the outside are not only unpleasant to the user, but there is a problem in that it is not easy to use the cleaner in a space where cleaning should be performed in a quiet state.

When a motor is rotated, an exciting force is generated due to a mass imbalance of the motor, an unbalanced electromagnetic force of the motor, or the like. The exciting force has a constant frequency such that excessive vibration can occur due to resonance when the exciting frequency coincides with the natural frequency of the motor.

In particular, this vibration can be easily delivered to the user in the case of a stick-type cleaner in which the motor is placed near a handle, possibly causing a problem.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a motor having an improved structure to reduce vibration and noise and a cleaner including the same.

Additional aspects will be set forth in part in the description which follows and, in part, will be apparent from the description, or may be learned by practice of the presented embodiments.

In accordance with an aspect of the disclosure, a motor of a cleaner is provided. The motor includes a stator including a plurality of teeth that are spaced apart from each other in a predetermined interval in a circumferential direction and a coil that is wound around the plurality of teeth, a rotor that is disposed inside the stator, and a cage that is disposed in at least one of a plurality of slots that are formed between the plurality of teeth, and the cage is configured to include a flow path to inject a bonding agent into the at least one of the plurality of slots.

In accordance with another aspect of the disclosure, the flow path may be formed in a region that faces the plurality of teeth.

In accordance with another aspect of the disclosure, the motor may further include the bonding agent that is interposed in the flow path for coupling the plurality of teeth with the cage.

In accordance with another aspect of the disclosure, the flow path may include an injection hole that penetrates one side of the cage, a first coupling surface that faces one side of the plurality of teeth, a second coupling surface that faces a side surface of the plurality of teeth.

In accordance with another aspect of the disclosure, the cage may include a ring that covers one side in an axial direction of the plurality of teeth, and at least one leg that is extendedly formed from the ring in an insertion direction of the cage, wherein the at least one leg is inserted between at least two of the plurality of teeth that are adjacent to each other.

In accordance with another aspect of the disclosure, the injection hole may be penetratingly formed in the ring.

In accordance with another aspect of the disclosure, the injection hole may be formed at a position that corresponds to a position of the plurality of teeth.

In accordance with another aspect of the disclosure, the first coupling surface may be formed at a lower end of the ring.

In accordance with another aspect of the disclosure, the second coupling surface may be formed along a length direction of the at least one leg.

In accordance with another aspect of the disclosure, the at least one leg is a plurality of legs that may be respectively inserted into a majority of the plurality of slots.

In accordance with another aspect of the disclosure, the at least one leg is a plurality of legs that may be respectively symmetrically disposed in the plurality of slots.

In accordance with another aspect of the disclosure, the at least one leg is a plurality of legs that may be respectively inserted into all of the plurality of slots.

In accordance with another aspect of the disclosure, the at least one leg may include an inclined surface that is inclined inward along an insertion direction to the stator.

In accordance with another aspect of the disclosure, the at least one leg may include an end projection that is extendedly formed from a width of the at least one leg at an outer end portion and an engaging protrusion that protrudes from the at least one leg at an inner end portion.

In accordance with another aspect of the disclosure, the cage may include a first cage that is inserted to a top side of the stator and a second cage that is inserted to a bottom side of the stator.

In accordance with another aspect of the disclosure, a cleaner is provided. The cleaner includes a main body, a suction head configured to vacuum substances from a surface to be cleaned into the main body of the cleaner, and a motor that is disposed inside the main body of the cleaner.

In accordance with another aspect of the disclosure, the motor may include a stator including a plurality of teeth spaced apart in a predetermined interval in a circumferential direction and a coil wound around the plurality of teeth, a rotor that is disposed inside the stator, and a cage that is disposed in at least one of a plurality of slots that are formed between the plurality of teeth, wherein the cage is configured to include a flow path to inject a bonding agent into the at least one of the plurality of slots.

In accordance with another aspect of the disclosure, the flow path may include an injection hole that penetrates one side of the cage, a first coupling surface that faces one side of the plurality of teeth, and a second coupling surface that faces a side surface of the plurality of teeth.

In accordance with another aspect of the disclosure, a method for manufacturing a motor of a cleaner including a rotor and a stator is provided. The method includes winding a coil around a plurality of teeth that are spaced apart from each other in a predetermined interval in a circumferential direction, coupling a cage, that is disposed in at least one of a plurality of slots formed between the plurality of teeth, to the stator, and disposing a rotor configured to be rotatable inside of the stator, wherein the coupling of the cage to the plurality of teeth may include injecting a bonding agent into at least one of the plurality of slots through a flow path that is formed in the cage.

In accordance with another aspect of the disclosure, the cage includes a ring that covers one side of an axial direction of the plurality of teeth, and a leg that is extendedly formed in an insertion direction of the cage from the ring, and the ring may be bonded with one side in an axial direction of the plurality of teeth, and the leg may be bonded with another side of the plurality of teeth.

In accordance with another aspect of the disclosure, the flow path may include an injection hole that penetrates the ring, a first coupling surface formed in the ring, and a second coupling surface that is connected to the first coupling surface and formed on one side surface of the leg.

In accordance with another aspect of the disclosure, the motor having the above structure according to an embodiment may reduce vibration and noise of the motor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Examples described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

Terms such as first and second may be used to describe various components, but the components should not be limited by the terms. The terms may be used only for the purpose of distinguishing one component from another component. For example, without departing from the scope of the disclosure, the first component may be referred to as the second component, and similarly the second component may also be referred to as the first component.

Terms used in the embodiments of the disclosure may be interpreted as meanings commonly known to those of ordinary skill in the art unless otherwise defined.

In addition, terms such as "front end", "back end", "upper portion," "lower portion", "upper end", "lower end," or the like, used in the disclosure are defined based on the drawings, and by each term, the shape and location of each component is not limited.

Figure 1:
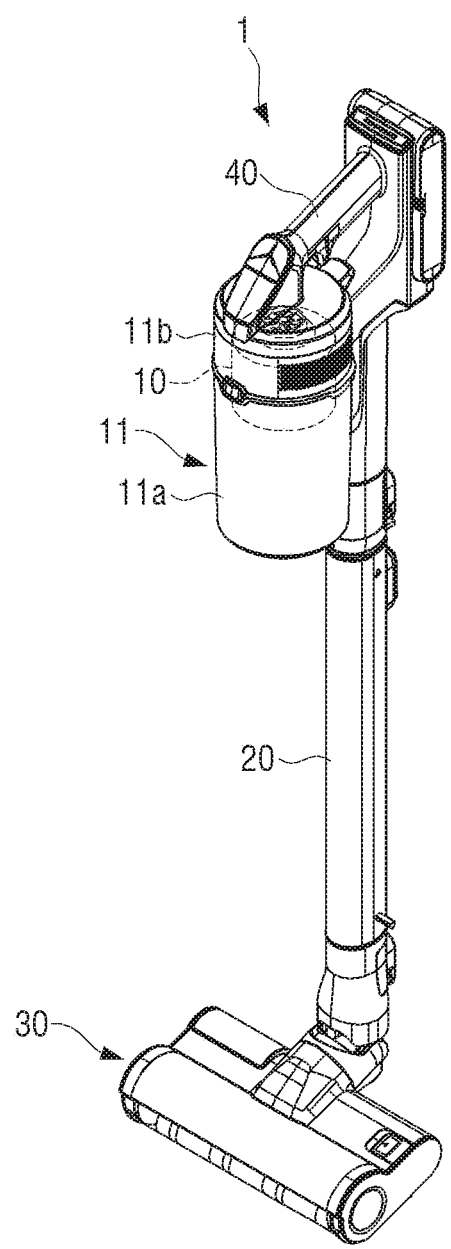
FIG. 1 is a view illustrating a stick-type cleaner including a motor according to an embodiment of the disclosure.

FIG. 1 is a view illustrating a stick-type cleaner including a motor according to an embodiment of the disclosure.

Figure 2:
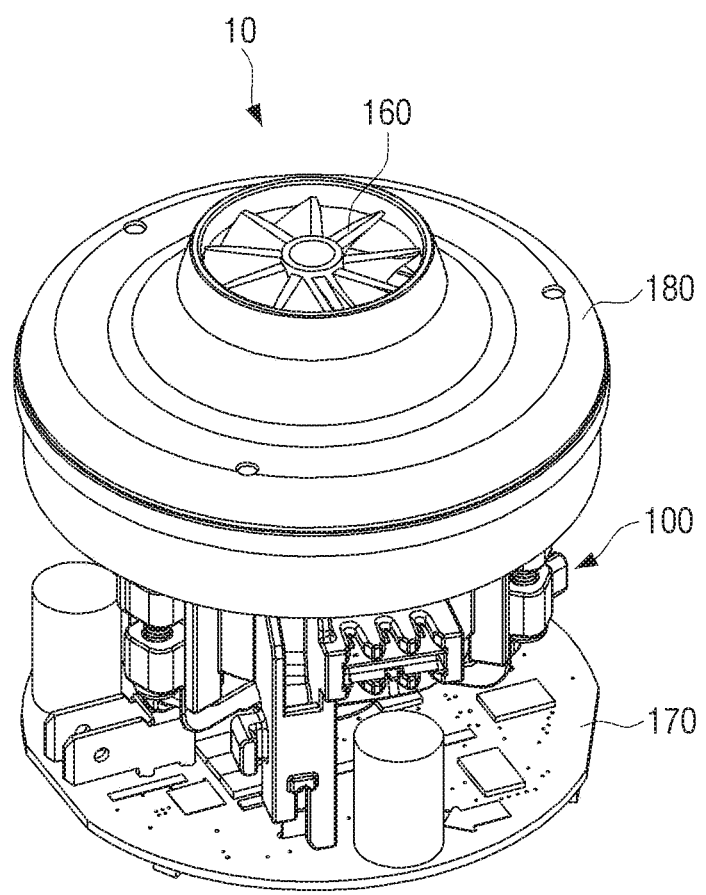
FIG. 2 is a perspective view of a motor assembly according to an embodiment of the disclosure.

FIG. 2 is a perspective view of a motor assembly according to an embodiment of the disclosure.

Referring to FIGS. 1 and 2, a cleaner including a motor 100 may include a stick-type cleaner 1. The embodiment is not limited thereto; for example, the motor 100 may be used for an upright type cleaner.

The motor 100 is applicable to various household appliances in addition to the cleaner. Hereinafter, the stick-type cleaner 1 including the motor 100 will be mainly described.

The cleaner 1 may include a cleaner main body 11 and a suction head 30. The cleaner 1 may include a stick 20 that connects the cleaner main body 11 and the suction head 30 and a grip 40 that is connected to the cleaner main body 11.

The grip 40 is a part that is coupled to the cleaner main body 11, and is provided so that the user may manipulate the cleaner 1 by gripping. The grip 40 is provided with a manipulation portion (not shown) for controlling the cleaner 1 by the user.

The suction head 30 may be provided at a lower portion of the cleaner main body 11 so as to be in contact with the surface to be cleaned. The suction head 30, which is in contact with the surface to be cleaned, may be provided to cause dust or dirt from the surface to be cleaned to flow into the inside of the cleaner main body 11 by suction force generated from a motor assembly 10.

The cleaner main body 11 may include a dust collecting device 11a and a driving device 11b provided therein. The dust collecting device 11a may be provided to collect dust or dirt from the suction head 30 that has been vacuumed from the surface to be cleaned.

The driving device 11b may include the motor assembly 10 provided to drive the cleaner 1. The motor assembly 10 may generate power to generate suction force inside the cleaner main body 11.

Figure 3:
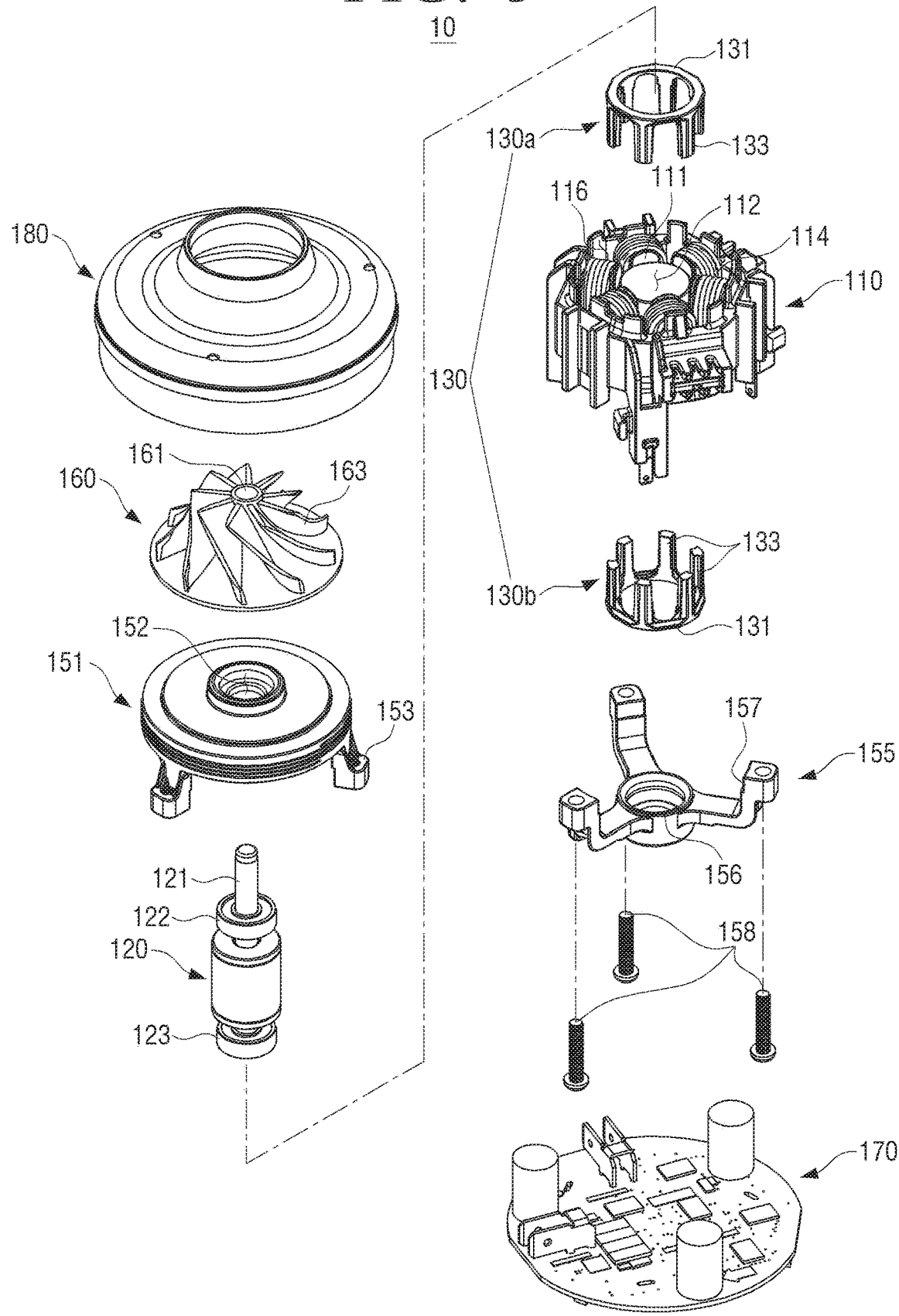
FIG. 3 is an exploded perspective view of a motor assembly according to an embodiment of the disclosure.

FIG. 3 is an exploded perspective view of a motor assembly according to an embodiment of the disclosure.

Referring to FIGS. 2 and 3, the motor assembly 10 may include the motor 100 including a stator 110, a rotor 120, and a cage 130, an impeller 160 coupled to a rotating shaft 121 of the rotor 120 to generate flow of air, a cover 180 for covering the impeller 160 and guiding air vacuumed by the impeller 160, and a substrate 170 for controlling the motor assembly 10.

The motor 100 may include the stator 110, the case 130 fixedly coupled to the stator 110, and the rotor 120 that is rotatably disposed inside the stator 110.

The stator 110 may be configured to generate magnetic flux when current is applied to a coil 114.

The stator 110 may include a plurality of teeth 111 (see FIG. 6) that are formed in a ring shape and extend inwardly and the coil 114 that is wound around the plurality of teeth 111.

A rotor accommodating portion 112, which is a space for receiving the rotor 120, which will be described later, may be formed in a center portion of the stator 110. The stator 110 may be formed by stacking a plurality of steel plates.

The plurality of teeth 111 may extend inwardly in a radial direction of the stator 110 from the inner circumferential surface of the stator 110 and may be spaced apart from each other along the inner circumferential surface of the stator 110. The plurality of teeth 111 may extend radially toward the rotor accommodating portion 112.

The teeth 111 may be formed so that the coil 114 is wound upon each. In addition, the teeth 111 may include extension portions 113 (see FIG. 6) of which a width is partially extended at an inner end portion adjacent to the rotor accommodating portion 112. The extension portions 113 may be formed in such a manner than the width of the teeth 111 is partially extended at the inner end of the teeth 111 adjacent to the rotor 120 to prevent the coil 114 wound around the teeth 111 to escape toward the rotor accommodating portion 112.

In addition, the area that the rotor 120 and the stator 110 may face can be widened through the extension portions 113 in which the width of the teeth 111 is partially extended.

The extension portions 113 of the plurality of teeth 111 annularly disposed inside the stator 110 may partition the rotor accommodating portion 112 in which the rotor 120 may rotate, and a space gap of a predetermined interval for rotation of the rotor 120 may be formed between the extension portions 113 of the teeth 111 and the outer circumferential surface of the rotor 120.

Since the plurality of teeth 111 are disposed at regular intervals from each other in the circumferential direction, a slot 116 may be formed between the two adjacent teeth 111. The slot 116 may penetrate the stator 110 up and down. Specifically, the slot 116 may be formed between the two adjacent teeth 111 to which the coil 114 is wound and between each extension portion 113.

In a portion of the slot 116, the coil 114 wound around the teeth 111 may be accommodated, and in a remaining portion, the cage 130 which is described below may be accommodated. A bonding agent may be injected into the slot 116 in which the cage 130 is accommodated to increase the coupling force between the cage 130 and the teeth 111.

In order to adjust the natural frequency of the stator 110, the cage 130 may be inserted into the stator 110.

The cage 130 may be disposed in at least one slot 116 among the plurality of slots 116 and may connect the plurality of teeth 111. To be specific, the cage 130 may be disposed between the extension portions 113 of the teeth 111.

The cage 130 may include a plurality of legs 133 inserted between the plurality of teeth 111, and a ring 131 connecting the plurality of legs 133. The plurality of legs 133 may be fixedly coupled between the extension portions 113 of the teeth 111.

The cage 130 may be composed of a first cage 130a coupled to one side of the stator 110 and a second cage 130b coupled to the other side of the stator 110. The first cage 130a and the second cage 130b may be coupled with the rotor 120 interposed therebetween. By coupling the first cage 130a and the second cage 130b to the stator 110, rigidity of the stator 110 may be increased, increasing the natural frequency.

The natural frequency raised by the combination of the cage 130 and the stator 110 does not match the exciting frequency at the predetermined motor rotation. Accordingly, vibration generated by matching the exciting frequency and the natural frequency may be avoided.

In order to lighten the motor 100, the cage 130 inserted into the stator 110 may be formed of a plastic material, but embodiments are not limited thereto.

A specific shape of the cage 130 and the coupling structure with the stator 110 will be described below.

The rotor 120 may be placed in the rotor accommodating portion 112 formed inside the stator 110 and may rotate with respect to a rotation axis. The rotor 120 may interact with the stator 110 in an electromagnetic manner.

The rotor 120 may include the rotation shaft 121 and bearings 122 and 123.

The rotation shaft 121 may be provided so that the rotor 120 rotates when the rotor 120 interacts with the stator in an electromagnetic manner.

The bearings 122 and 123 may include the first bearing 122 that is coupled to an upper side of the rotation shaft 121 and the second bearing 123 that is coupled to a lower side of the rotation shaft 121.

The first bearing 122 may be disposed between a first housing 151 and the rotation shaft 121 and provide support so that the rotation shaft 121 can be rotated, while the rotation shaft 121 is fixed to the first housing 151.

The second bearing 123 may be disposed between a second housing 155 and the rotation shaft 121 and also provide support so that the rotation shaft 121 can be rotated, while the rotation shaft 121 is fixed to the second housing 155.

The housings 151 and 155 may be arranged to be coupled to the outside of the stator 110. The housings 151 and 155 may include the first housing 151 coupled to one side of the stator 110 and the second housing 155 coupled to the other side of the stator 110.

The first housing 151 and the second housing 155 may be coupled with the rotor 120 and the stator 110 interposed therebetween. The rotor 120 may be fixed to the stator 110, as the first housing 151 and the second housing 155 are coupled.

The first housing 151 may include a first bearing seating portion 152 on which the first bearing 222 is seated, and a first coupling portion 153 extending in the axial direction and being coupled with the second housing 155.

The first housing 151 may be provided in a substantially cylindrical shape, and the first coupling portion 153 may extend in the axial direction from the first housing 151. The first coupling part 153 may be formed in the plural parts that are spaced apart along the circumferential direction of the first housing 151. The second housing 155 may include a second bearing seating portion 156 that is provided so that the second bearing 123 is seated and a second coupling portion 157 that is provided so as to be coupled to the first coupling portion 153 of the first housing 151.

The second coupling portion 157 may be provided to correspond to the number of the first coupling portions 153. The first coupling portion 153 and the second coupling portion 157 may be coupled by various methods known in the art. For example, the first coupling portion 153 and the second coupling portion 157 may be coupled by threaded coupling using bolts 158.

The motor assembly 10 may include the impeller 160 that is coupled to the rotation shaft 121 and generates flow of air.

The impeller 160 may include a shaft coupling portion 161 to which the rotation shaft 121 is coupled. When the rotation shaft 121 is coupled to the shaft coupling portion 161, the impeller 160 may rotate together with the rotation shaft 121. The impeller 160 may include a plurality of wings 163 forming a flow of air.

The cover 180 may be provided to cover the impeller 160. The cover 180 may be coupled with the first housing 151.

The motor assembly 10 may further include the substrate 170 provided to control the speed of the motor. The substrate 170 may be disposed under the motor, but is not limited thereto. The substrate 170 may be disposed at various locations depending on the type of cleaner.

Figure 4:
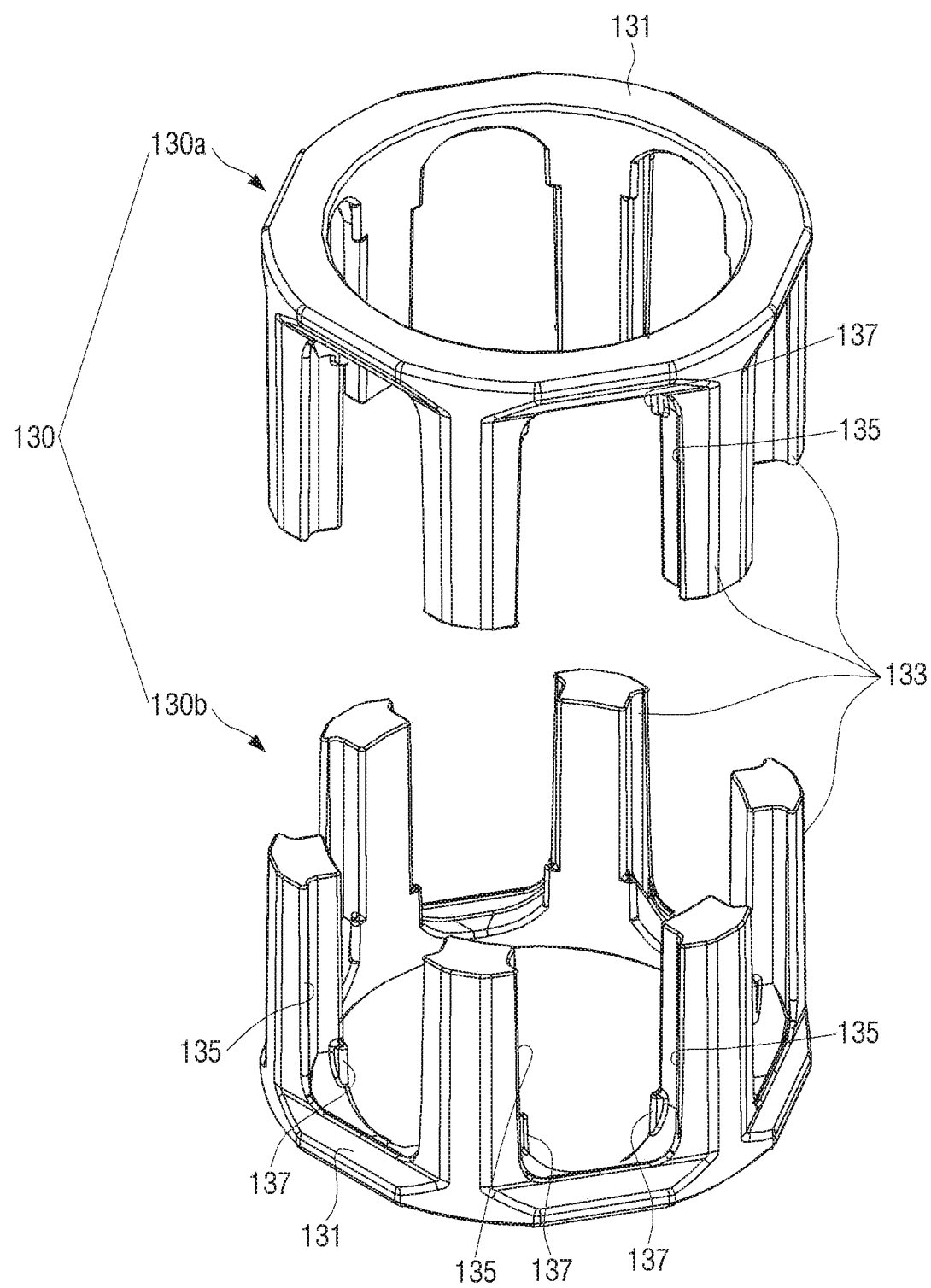
FIG. 4 is a perspective view of a cage according to an embodiment of the disclosure.

FIG. 4 is a perspective view of a cage according to an embodiment of the disclosure.

Referring to FIGS. 3 and 4, the cage 130 according to an embodiment may include the first cage 130a that is inserted to one side of the stator 110 and the second cage 130b that is inserted to another side of the stator 110.

The first cage 130a is inserted from the upper side of the stator 110, the second cage 130b may be inserted from the lower side of the stator 110 to face each other inside the stator 110. The first cage 130a and the second cage 130b may be coupled to the inside of the stator 110 to connect the plurality of teeth 111 into one.

The first cage 130a and the second cage 130b can have a same structure, but are not limited thereto. The first cage 130a and the second cage 130b may be symmetrically formed with respect to the stator 110. The second cage 130b has basically the same structure as the first cage 130a and thus, a description of the overlapping portions will be omitted.

The first cage 130a will be described below, and this will be the same for the description of the second cage 130b.

The first cage 130a may include the plurality of legs 133 that are extendedly formed in a direction of insertion of the first cage 130a and the ring 131 which connects the plurality of legs 133.

Each of the plurality of legs 133 may be disposed between two adjacent teeth 111 to connect the plurality of teeth 111 and prevent an opening within any of the slots 116.

Each of the plurality of legs 133 may be formed to correspond to each of the plurality of the slots 116.

The plurality of legs 133 may be disposed between the extension portions 113 and connect the plurality of teeth 111. The plurality of legs 133 may be formed to correspond to the outer surface of the plurality of teeth 111. The inner side of the plurality of legs 133 and the inner side of the extension portions 113 may be coupled to form an annular shape inside the stator 110.

The plurality of legs 133 may include an extended end portion 135 which is formed as the width of the plurality of legs 133 is partially extended at an outer end. The extended end portion 135 may be formed to surround the inner surface of the extension portions 113. The extended end portion 135 may be extendedly formed along the longitudinal direction of the plurality of legs 133. The extended end portion 135 may prevent the cage 130 from escaping toward the rotor 120.

In addition, the plurality of legs 133 may have a plurality of engaging protrusions 137 protruding from the inner end. The engaging protrusion 137 may be formed at the plurality of legs 133 adjacent to the ring 131. Although the locking protrusion 137 is illustrated as being adjacent to the ring 131 in FIG. 4, the embodiment is not limited thereto, and the engaging protrusion 137 may be formed in any part of the plurality of legs 133 and may be formed in plural. The engaging protrusion 137 may prevent the cage 130 from escaping in the radial direction of the stator 110.

The cage 130 may fix only a part of both sides of the teeth 111 coupled to the cage 130 onto the extended end portion 135 and the engaging projection 137. To be specific, the plurality of legs 133 may fix both sides of the extension portions 113 coupled by the cage 130 with the extended end portion 135 and the engaging protrusion 137. Accordingly, the cage 130 may be fixed to the stator 110 without departing in the centrifugal or radial direction even by the radial vibration of the motor 100.

The cage 130 may be insert-coupled in the stator 110 so that the teeth 111 is inserted between the extended end portion 135 and the engaging protrusion 137 of the plurality of legs 133.

The ring 131 may cover one side in an axial direction of the plurality of teeth 111. To be specific, the ring 131 of the first cage 130a may cover an upper end of the teeth 111 and the ring 131 of the second cage 130a may cover a lower end of the teeth 111.

The lower side of the ring 131 to which one side of the teeth 111 is coupled may be formed to correspond to one side of the teeth 111. Specifically, the lower side of the ring 131 may be formed in a semicircle shape so as to correspond to one side of the extension portions 113.

The cage 130 may include the plurality of legs 133 that are extendedly formed in the insertion direction from the ring 131, and when the cage 130 is coupled to the stator 110, one side of the teeth 111 and a side surface of the teeth 111 may be covered simultaneously.

The second cage 130b may also include the plurality of legs 133 extending in the insertion direction of the second cage 130b and the ring 131 connecting the plurality of legs 133. The plurality of legs 133 and rings 131 of the second cage 130b may be formed in the same manner as the first cage 130a.

The cage may be made of any one of the first cage 130a and the second cage 130b. The cage may be made of only the first cage 130a or the second cage 130b that is inserted to one side or the other side of the stator 110.

A portion between the two adjacent teeth 111 may be connected by a cage that is inserted only at one side of the stator 110. The cage inserted only at one side of the stator 110 is weaker in terms of coupling force than the cage inserted at both sides of the stator 110, but may reduce the weight of the motor 100. In addition, the cage inserted only at one side of the stator 110 may be easier to manufacture the motor 100 than the cage inserted at both sides of the stator 110.

The motor 100 may increase the rigidity of the stator 110 by connecting between the two adjacent teeth 111 by the inserted cage 130. The cage 130 may increase the natural frequency of the motor 100 by increasing the rigidity of the motor 100.

Figure 5:
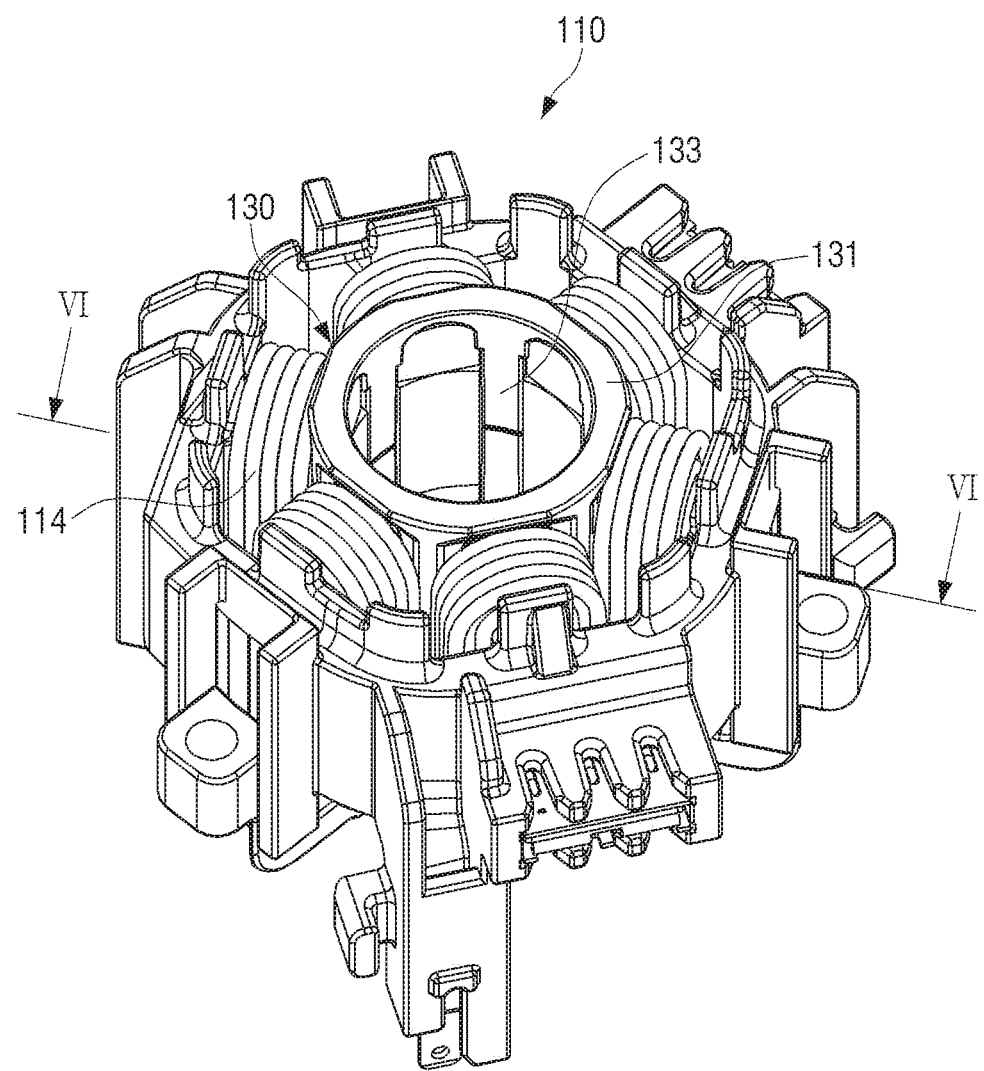
FIG. 5 is a perspective view illustrating a state where a cage is coupled to a stator according to an embodiment of the disclosure.

FIG. 5 is a perspective view illustrating a state where a cage is coupled to a stator according to an embodiment of the disclosure.

Figure 6:
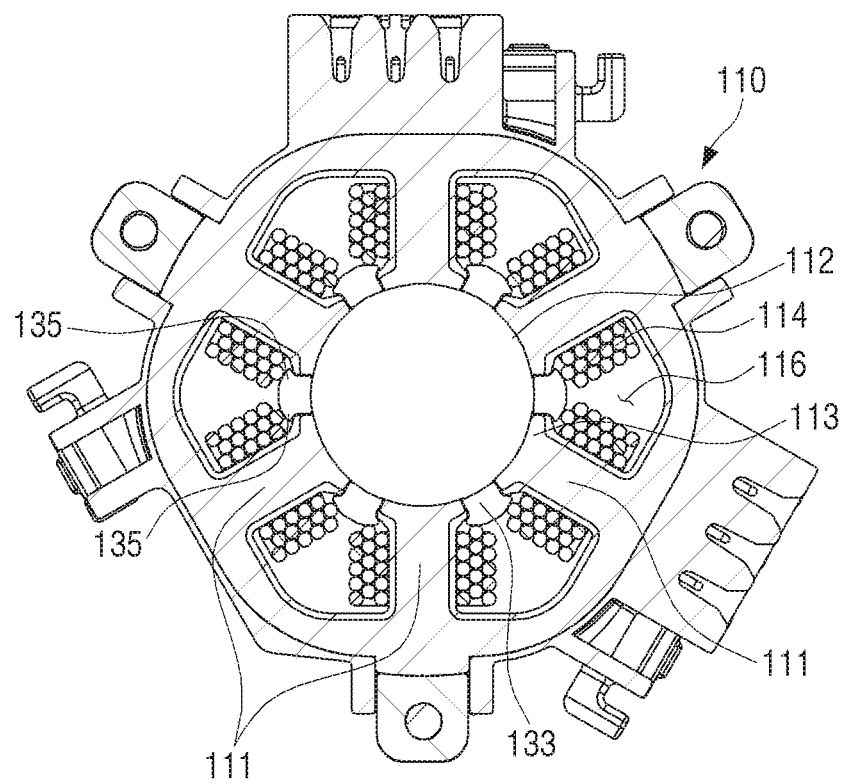
FIG. 6 is a cross-sectional view that is cut along "VI-VI" of FIG. 5 according to an embodiment of the disclosure.

FIG. 6 is a cross-sectional view that is cut along "VI-VI" of FIG. 5 according to an embodiment of the disclosure.

Referring to FIGS. 5 and 6, the plurality of teeth 111 need to pass between the two adjacent teeth 111 when the coil 114 is wound around the teeth 111, and may be spaced apart in the circumferential direction such that the slot 116 is formed between the two adjacent teeth 111.

The plurality of legs 133 may be inserted into the slot 116, which is the space formed between the two adjacent teeth 111 after the coil 114 is wound. The plurality of legs 133 may be positioned to be adjacent to the extension portions 113, which is a region where the coil 114 is not wound.

The plurality of legs 133 inserted to the slot 116 may block the opening of the slot 116. By coupling the plurality of legs 133 to the slot 116, the plurality of teeth 111 which are spaced apart from each other may be connected.

The extended end portion 135 formed at the outer end of the plurality of legs 133 may be disposed to be supported on the inner surface of the extension portions 113. The extended end portion 135 supported by the extension portions 113 may prevent the cage 130 from moving in the direction of the rotor 120.

The plurality of legs 133 may further include an inclined surface in which the cage 130 inclines inwardly along the direction in which the stator 110 is inserted so as to be easily inserted between the two adjacent teeth 111.

Figure 7:
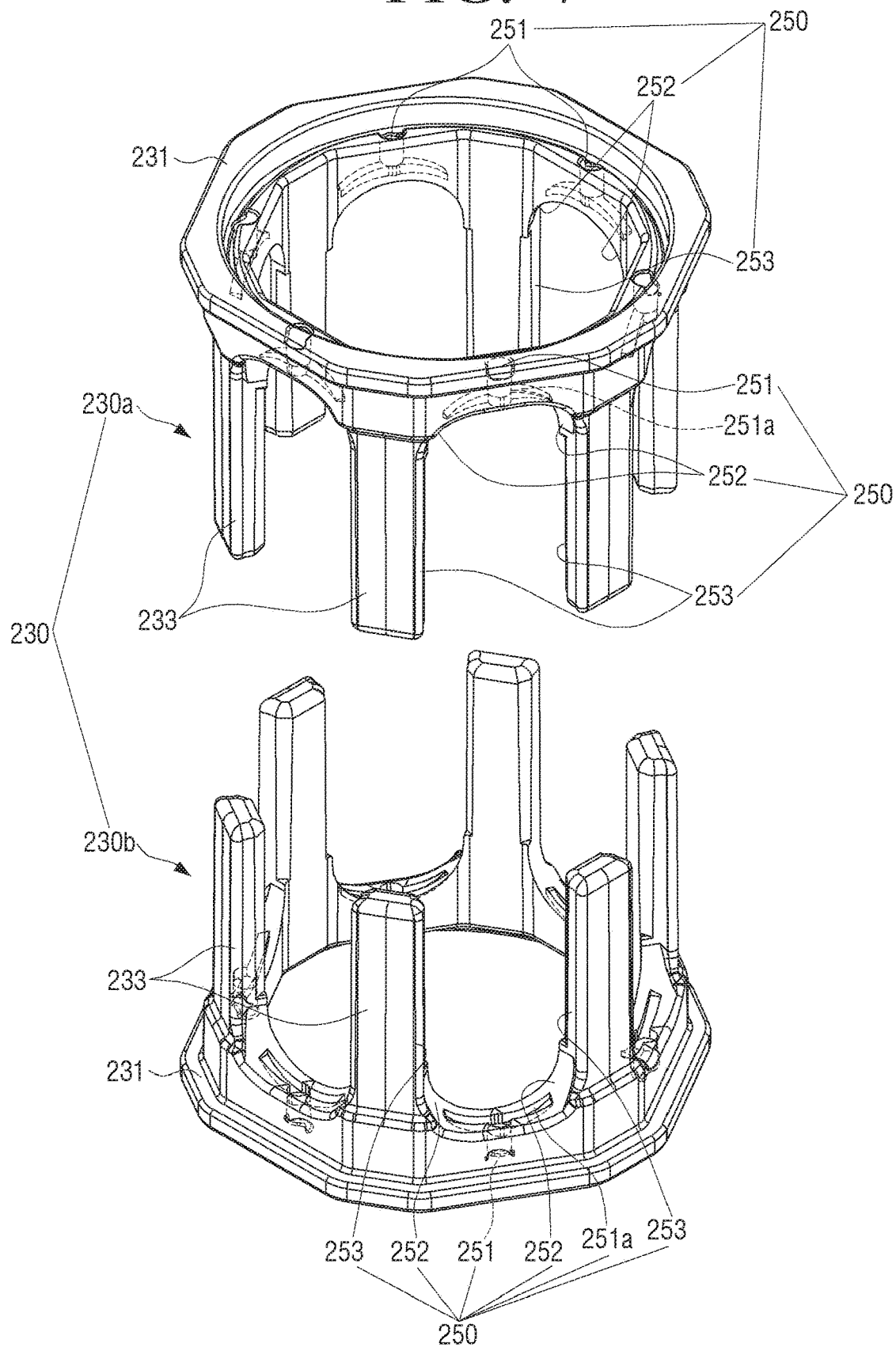
FIG. 7 is a perspective view of another cage according to an embodiment of the disclosure.

FIG. 7 is a perspective view of another cage according to an embodiment of the disclosure.

Referring to FIG. 7, a cage 230 according to another embodiment has mostly the same configuration as the cage 130 described with reference to FIG. 4, but the cage 230 is different in that the cage 230 includes a flow path 250 for injecting a bonding agent into at least one slot. Therefore, the configuration of the cage 230 according to another embodiment which overlaps with the cage 130 described with reference to FIG. 4 will not be described in detail, and the flow path 250 which has a difference will be mainly described.

The cage 230 may include a first cage 230a that is inserted to one side of the stator 110 and a second cage 230b that is inserted to the other side of the stator 110.

The first cage 230a and the second cage 230b have the same structure. The first cage 230a and the second cage 230b may be disposed symmetrically with respect to the stator 110.

The first cage 230a may include a plurality of legs 233 extendedly formed in an insertion direction of the first cage 230a, a ring 231 connecting the plurality of legs 233, and the flow path 250 for injecting a bonding agent into the at least one slot 116.

The flow path 250 may be formed in one area of the cage 230 facing the teeth 111.

The flow path 250 may inject a bonding agent into the at least one slot 116 with the cage 230 being coupled to the stator 110. Specifically, the bonding agent injected through the flow path 250 may be interposed in a portion of the slot 116 formed between the cage 230 and the teeth 111. By the bonding agent injected through the flow path 250, the cage 230 and the teeth 111 may be bonded to each other. The flow path 250 for injecting the bonding agent may increase the coupling force between the cage 230 and the teeth 111.

Specifically, the flow path 250 may include an injection hole 251 which penetrates one side of the cage 230, a first coupling surface 252 facing one side of the teeth 111, and a second coupling surface 253 facing a side surface of the teeth 111.

The injection hole 251 may be formed to penetrate from one side of the ring 231 to the other side of the ring 231 at a predetermined position of the ring 231. The injection hole 251 may be formed at a position corresponding to the upper portion of the teeth 111. The injection hole 251 may be formed between two adjacent legs 233 of the plurality of legs 233.

The bonding agent may be injected into the slot 116 through the injection hole 251. That is, the bonding agent injected through the injection hole 251 may be interposed between the cage 230 and the teeth 111 to bond the cage 230 and the teeth 111 to each other.

One end adjacent to the lower end of the ring of the injection hole 251 may include a distribution groove 251a extendedly formed along the circumference of the ring 231. The distribution groove 251a may be extendedly formed toward the legs 233 disposed on both sides with respect to the injection hole 251. The center of the distribution groove 251a may be formed to be in communication with the injection hole 251.

The bonding agent that is injected through the injection hole 251 may move to the plurality of legs 233 of both sides along the distribution groove 251a. The distribution groove 251a may distribute the bonding agent that is injected to the injection hole 251 to the plurality of legs 233 that are disposed at both sides of the injection hole 251.

The first coupling surface 252 may be formed at the lower end of the ring 231, and may be formed between two legs of the plurality of legs 233 adjacent to each other. The first coupling surface 252 may be formed on both sides of the distribution groove 251a, respectively. The first coupling surface 252 may be formed as a connection region in which the ring 231 and the plurality of legs 233 are connected.

The bonding agent injected into the injection hole 251 may be interposed in the first coupling surface 252 by the distribution groove 251a. The bonding agent may be interposed on the first coupling surface 252 to bond the teeth 111 and the ring 231. Specifically, the ring 231 and the teeth 111 may be bonded to each other by a bonding agent injected between one side of the teeth 111 and the ring 231.

The second coupling surface 253 may be extendedly formed along a longitudinal direction of the plurality of legs 233. That is, the second coupling surface 253 may be the side surface of each leg of the plurality of legs 233. The second coupling surface 253 may be formed in each of both side surfaces of the plurality of legs 233.

The second coupling surface 253 may be connected to the first coupling surface 252, and the bonding agent that is injected to the injection hole 251 may be interposed in the second coupling surface 253 via the first coupling surface 252.

A bonding agent may be interposed between the second coupling surface 253 and the teeth 111 and the plurality of legs 233 may be bonded to each other. Specifically, the plurality of legs 233 and the teeth 111 may be bonded by a bonding agent injected between each side of the plurality of legs 233 and the extension portions 113.

The bonding agent injected from the injection hole 251 may move along the first coupling surface 252 and the second coupling surface 253.

The cage 230 may inject the bonding agent into the slot 116 through the flow path 250, and the cage 230 may be coupled to the teeth 111 by the injected bonding agent interposed in the flow path 250.

The cage 230 may be bonded to the stator 110 by bonding with the teeth 111. While the cage 230 is coupled to the stator 110, the bonding agent may be interposed between the cage 230 and the plurality of teeth 111 by the flow path 250 that injects the bonding agent into the slot 116, and the cage 230 may be bonded to the plurality of teeth 111 by the interposed bonding agent. Accordingly, the cage 230 may be fixed to the stator 110 without departing even by the axial vibration or radial vibration of the motor 100.

The cage 230 may be bonded to the stator 110 and connect the teeth 111 that are disposed independently. The cage 230 may connect between plurality teeth 111 and increase the natural frequency of the motor 100 itself.

The cage 230 may connect the plurality of teeth 111 so that the natural frequency does not match the exciting frequency. Accordingly, a large vibration caused by resonance, which may occur when the exciting frequency and the natural frequency are close, may be prevented.

The second cage 230b may include the flow path 250 to inject the bonding agent into the slot 116 in the same manner as the first cage 230a.

The motor 100 may further increase the rigidity of the stator 110 by the cage 230 that is bonded between the two adjacent teeth 111. As the teeth 111 are fixed to the cage 230, the rigidity of the stator 110 is improved to increase the rigidity of the motor 100, thereby increasing the natural frequency of the motor 100. As the natural frequency of the motor 100 is increased and is beyond the range of the exciting frequency, noise and vibration of the motor may be more effectively suppressed.

Figure 8A:
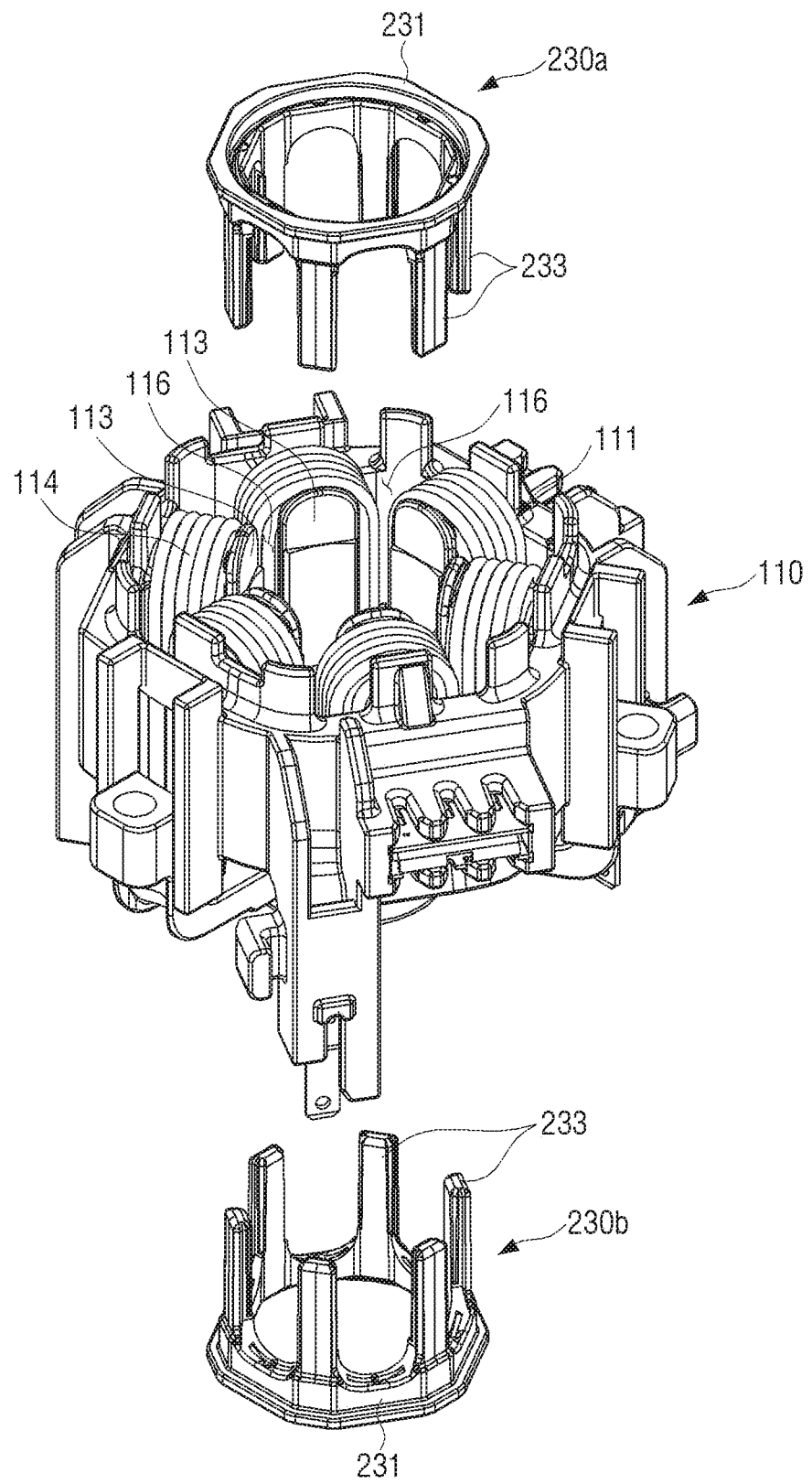
FIG. 8A is a view illustrating a process of inserting a cage into a stator according to an embodiment of the disclosure.

FIG. 8A is a view illustrating a process of inserting a cage into a stator according to an embodiment of the disclosure.

Referring to FIG. 8A, the coil 114 may be wound around each of the plurality of teeth 111. The first cage 230a and the second cage 230b may be inserted into upper and lower sides of the stator 110, on which the coil 114 is wound, respectively, of the plurality of teeth 111.

To be specific, the ring 231 of the first cage 230a may cover the upper side of the extension portions 113 and the ring 231 of the second cage 230b may cover the lower side of the extension portions 113.

The plurality of legs 233 of the first cage 230a and the second cage 230b may be inserted to the slot 116, respectively. Both sides of each leg of the plurality of legs 233 may be coupled to one side of the teeth 111, respectively.

Figure 8B:
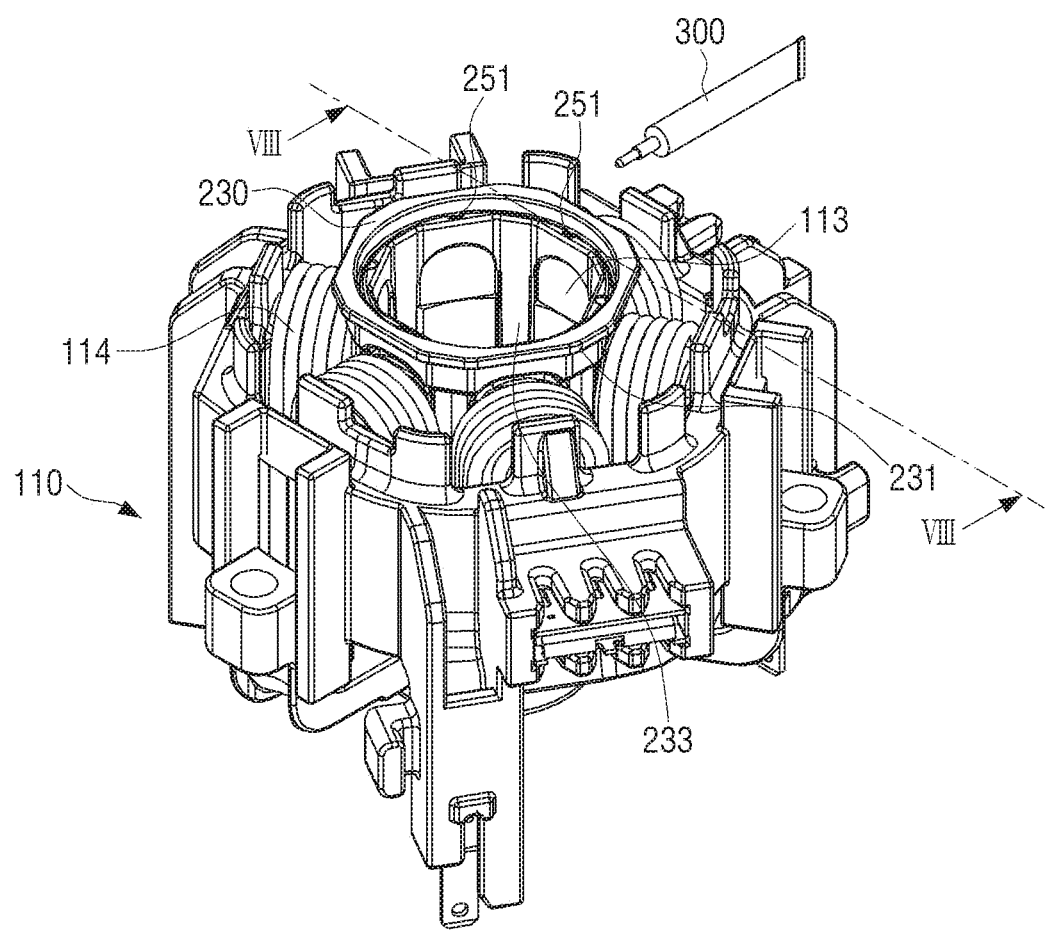
FIG. 8B is a view illustrating a process of injecting a bonding agent in a state where a cage is inserted into a stator according to an embodiment of the disclosure.

FIG. 8B is a view illustrating a process of injecting a bonding agent in a state where a cage is inserted into a stator according to an embodiment of the disclosure.

Figure 8C:
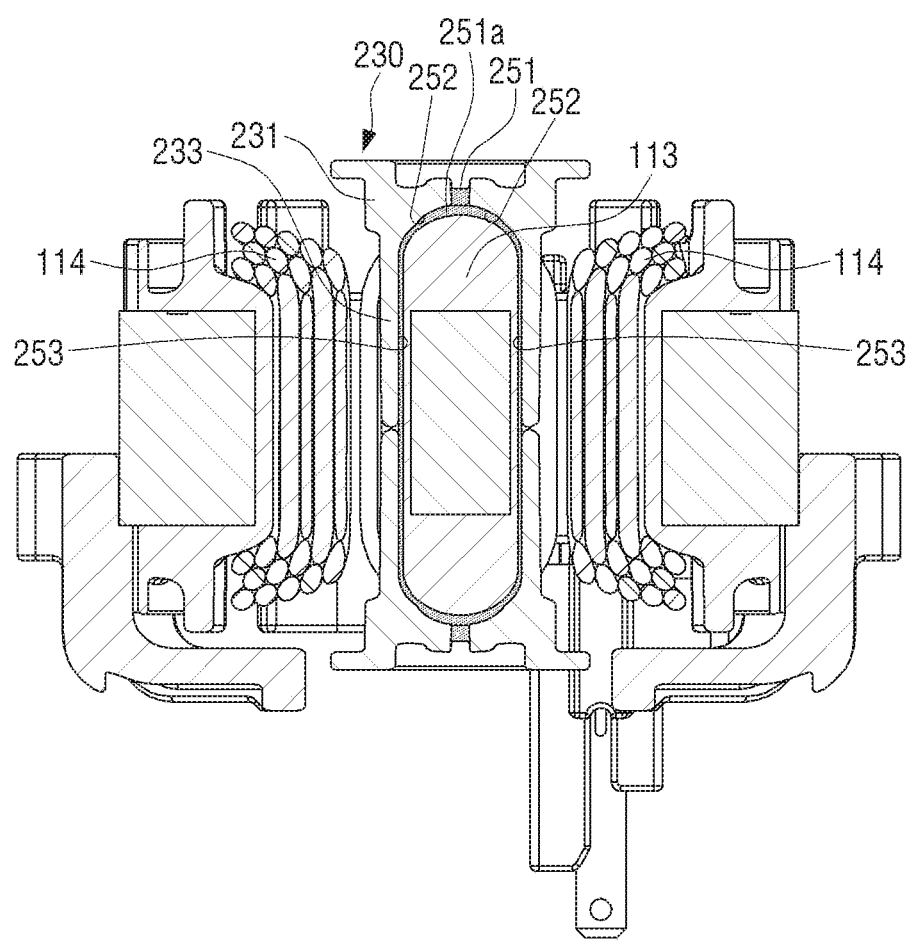
FIG. 8C is a cross-sectional view that is cut along "VII-VII" of FIG. 8B according to an embodiment of the disclosure.

FIG. 8C is a cross-sectional view that is cut along "VII-VII" of FIG. 8B according to an embodiment of the disclosure.

Referring to FIGS. 8B and 8C, while the cage 230 is inserted in the stator 110, in order to bond the cage 230 and the stator 110, a bonding agent 300 may be injected to the flow path 250 of the cage 230.

The bonding agent 300 injected to the cage 230 may move along the flow path 250 and may be interposed at a space that is formed between the cage 230 and the teeth 111.

The bonding agent 300 may be injected through the injection hole 251. The injected bonding agent 300 may be interposed in the distribution groove 251a after passing through the injection hole 251, and move to the first coupling surface 252 through the distribution groove 251a.

A part of the bonding agent 300 that has moved to the first coupling surface 252 may be interposed in the first coupling surface 252. The bonding agent interposed in the first coupling surface 252 may bond the ring 231 and the teeth 111. The bonding agent 300 may be interposed between the lower end of the ring 231 and one side of the teeth 111 to increase the coupling force between the cage 230 and the teeth 111.

The remaining portion of the bonding agent 300 that has moved to the first coupling surface 252 may move to the second coupling surface 253. The bonding agent interposed in the second bonding surface 253 may be bonded to the legs 233 and the teeth 111. The bonding agent 300 may be interposed in a space that may be formed between one side of each leg of the plurality of legs 233 and the side of the teeth 111 to connect between the cage 230 and the teeth 111.

Figure 9:
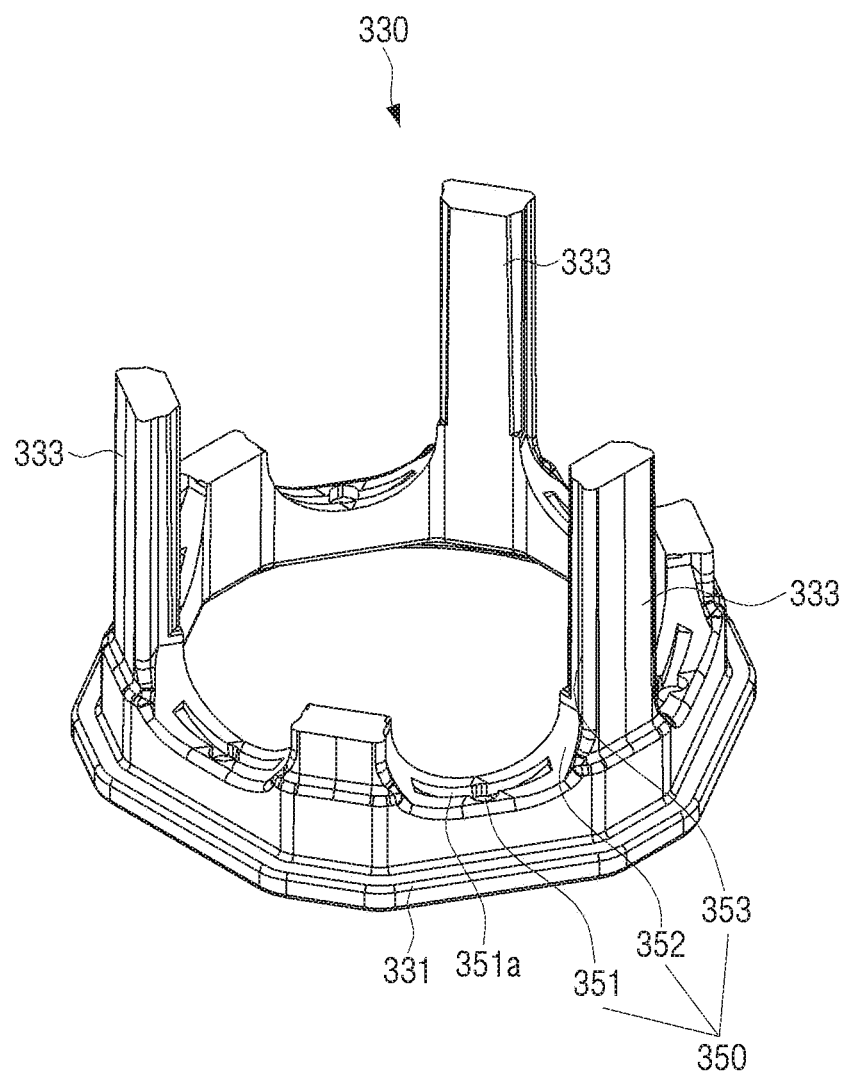
FIG. 9 is a perspective view of another cage according to an embodiment of the disclosure.

FIG. 9 is a perspective view of another cage according to an embodiment of the disclosure.

Referring to FIG. 9, a cage 330 according to another embodiment has mostly the same configuration as the cage 230 described in FIG. 7, except that the cage 330 is disposed in only a portion of the plurality of slots 116. That is, the cage 330 may include a fewer number of legs 333 than the number of slots 116. Accordingly, the configurations that overlap with the cage 230 as illustrated in FIG. 7 will not be further described, and the number and arrangement of the legs 333 having a difference will be mainly described.

The cage 330 may include a first cage and a second cage which are inserted into both sides of the stator 110, respectively. FIG. 9 illustrates only the second cage inserted below the stator 110, but may further include the first cage having the same structure as the second cage and symmetrically formed with respect to the center surface of the stator 110.

The cage 330 may include at least one leg 333 that is extendedly formed in the insertion direction of the cage 330 and the ring 331 that secures the at least one leg 333 and in the case of a plurality of legs 333, connects the plurality of legs 333 as shown in FIG. 9.

The ring 331 may include an injection hole 351 of a flow path 350 for injecting a bonding agent into at least one slot 116. One end adjacent to the lower end of the ring of the injection hole 351 may include a distribution groove 351a extendedly formed along the circumference of the ring 331. The distribution groove 351a may be extendedly formed toward the legs 333 disposed on both sides with respect to the injection hole 351. The center of the distribution groove 351a may be formed to be in communication with the injection hole 351. One side of a first coupling surface 352 and the tooth 111 formed at the lower end of the ring 331 may be bonded to each other. One side of the leg 333 may be composed of a second coupling surface 353 of the flow path 350. The second coupling surface 453 may be formed to correspond to the length of the slot 116 penetrating an upper portion and lower portion of the stator 110.

The number of legs 333 may be provided to be inserted into at least half of the plurality of slots 116. For example, the cage 330 may include three legs 333 to be disposed in three of six slots 116 formed in the stator 110.

In this example, all three legs may be disposed at alternate intervals in order to be alternately arranged in the plurality of slots 116. Each leg 333 may be disposed to form the same angle with respect to the center of the cage 330. In FIG. 9, it has been illustrated that the legs 333 are formed to be disposed at alternate intervals, but it is not limited thereto, and all three legs may be disposed continuously, two legs may be disposed adjacently, and/or one leg may be disposed at alternate intervals.

According to the placement of the legs 333, the motor 100 may have a different natural frequency. The cage 330 may include the legs 333 disposed at a predetermined position so that the motor 100 has the natural frequency that is not adjacent to the exciting frequency.

In another example, the cage 330 may include four legs 333 extendedly formed in the insertion direction of the cage 330 and the ring 331 connecting the four legs 333.

The four legs 333 may be arranged in various ways. For example, referring to FIG. 10, the four legs 333 may be disposed at positions facing each other. The four legs 333 may be composed of a pair of two legs 333 neighboring each other and a pair of two legs 333 neighboring each other disposed at alternative intervals, all four legs may be serially disposed, three of the four legs may be disposed adjacently and the other leg may be disposed across one another.

The legs 333 of the cage 330 may also be formed with a predetermined number. For example, when the plurality of slots 116 is six, the legs 333 may be formed from one to six. Embodiments of the three or four legs have been described, but the embodiment may include the legs 333 which may be disposed in at least one slot 116 among the plurality of slots 116.

Depending on the number of legs 333 and the disposition of the legs 333, the motor 100 may have different natural frequencies. The cage 330 may include a predetermined number of legs 333 disposed at a predetermined position so as to have a natural frequency that is not adjacent to the frequency of the motor 100.

Figure 10:
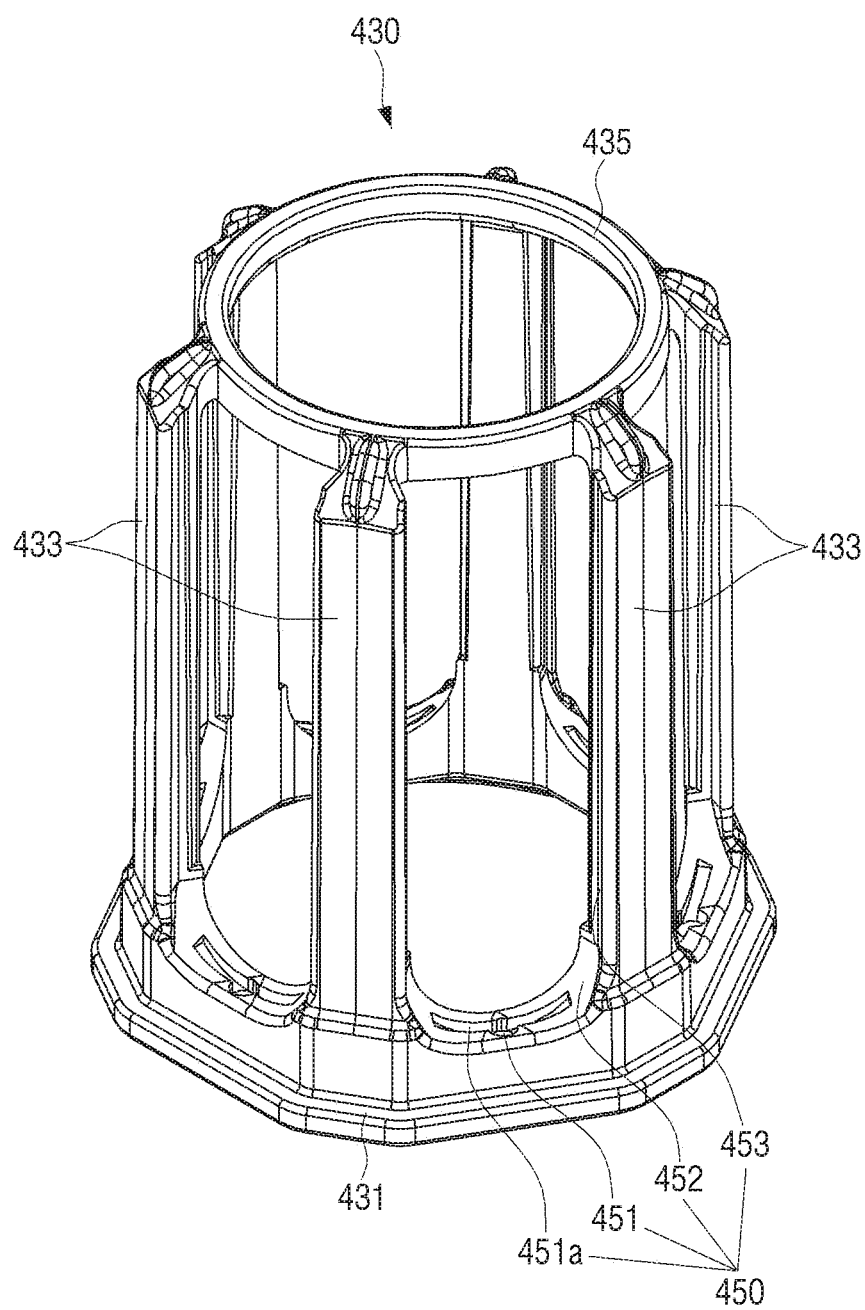
FIG. 10 is a perspective view of another cage according to an embodiment of the disclosure.

FIG. 10 is a perspective view of another cage according to an embodiment of the disclosure.

Referring to FIG. 10, the cage 430 according to another embodiment has mostly the same configuration as that of the cage 230 described with reference to FIG. 7, but there is a difference in that the cage 430 is composed of one member inserted only on one side of the stator 110. Therefore, the configurations of the cage 430 which are the same as the cage 230 described with reference to FIG. 7 will be omitted, and the structure of the cage 430 having a difference will be described.

The cage 430 according to an embodiment may be inserted into one side of the stator 110. The cage 430 may include a plurality of legs 433 extending in the insertion direction of the cage 430 and a first ring 431 and a second ring 435 connecting the plurality of legs 433.

The plurality of legs 433 may be formed to have a length corresponding to the length of the plurality of teeth 111. The plurality of legs 433 may be disposed between the two adjacent teeth 111 and connect the plurality of teeth 111. Each of the plurality of legs 433 may be formed to correspond to a slot of the plurality of slots 116.

One side of each leg of the plurality of legs 433 may be composed of a second coupling surface 453 of a flow path 450. The second coupling surface 453 may be formed to correspond to the length of the slot of the plurality of slots 116 penetrating an upper portion and lower portion of the stator 110.

The first ring 431 may be formed to connect one side of the plurality of legs 433. The first ring 431 may cover one side of the plurality of teeth 111. The first ring 431 may be formed in an annular shape having a circumference larger than the inner circumferential surface of the plurality of teeth 111.

The first ring 431 may prevent the cage 430 from moving in an axial direction by the axial vibration of the motor.

The first ring 431 may include an injection hole 451 of the flow path 450 for injecting a bonding agent into at least one slot of the plurality of slots 116. One end adjacent to the lower end of the ring of the injection hole 451 may include a distribution groove 451a extendedly formed along the circumference of the ring 431. The distribution groove 451a may be extendedly formed toward the legs 433 disposed on both sides with respect to the injection hole 451. The center of the distribution groove 451a may be formed to be in communication with the injection hole 451. One side of a first coupling surface 452 and the tooth of the plurality of teeth 111 formed at the lower end of the first ring 431 may be bonded to each other.

The second ring 435 may be formed to connect the other side of the plurality of legs 433. The second ring 435 may be formed in an annular shape having a circumference that is shorter than the inner circumference of the plurality of teeth 111.

The natural frequency of the motor 100 may be adjusted according to the rigidity of the stator 110. That is, the natural frequency of the motor may vary depending on the structure of the cage capable of increasing the rigidity of the stator 110. Specifically, the natural frequency of the motor may be adjusted according to the number of cages coupled to the stator 110, the shape of the cage, the number of cage legs, the disposition of the legs, or the like.

Accordingly, the stator 110 may be coupled to the cage so that the motor has a natural frequency that is not consistent with the exciting frequency.

Figure 11:
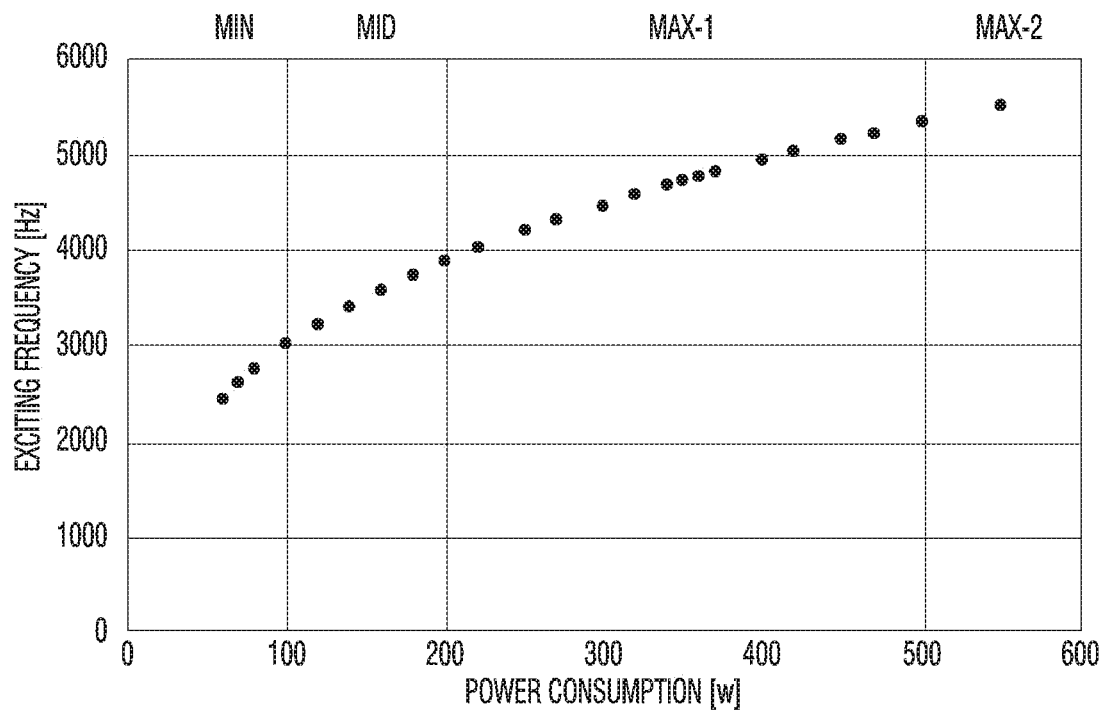
FIG. 11 is a graph illustrating a region of an exciting frequency upon driving of a motor according to an embodiment of the disclosure.

FIG. 11 is a graph illustrating a region of an exciting frequency upon driving of a motor according to an embodiment of the disclosure.

Figure 12:
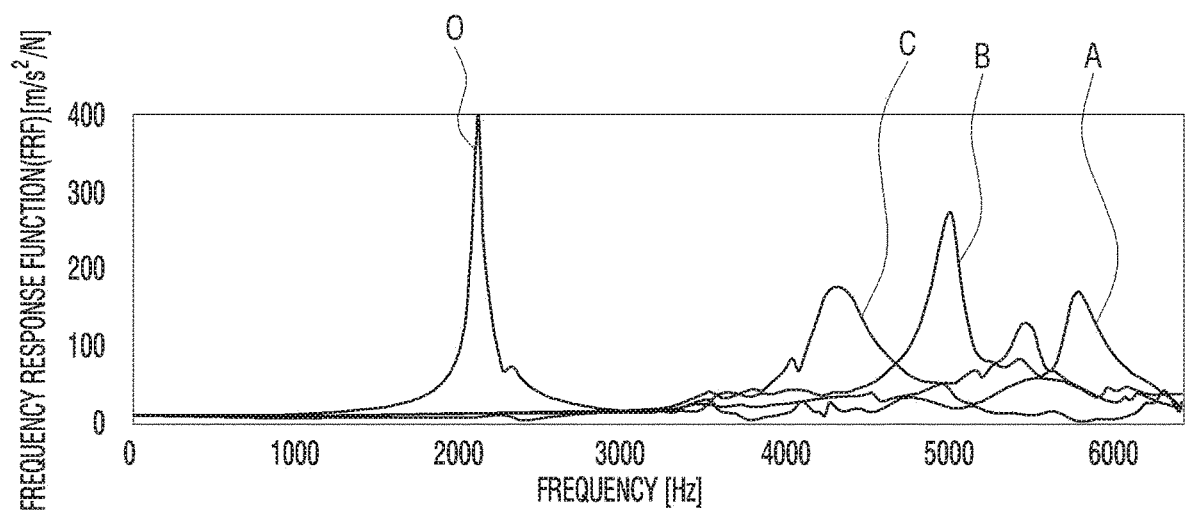
FIG. 12 is a graph comparing a natural frequency of a motor including a cage with a natural frequency of a general motor according to an embodiment of the disclosure.

FIG. 12 is a graph comparing a natural frequency of a motor including a cage with a natural frequency of a general motor according to an embodiment of the disclosure.

Referring to FIG. 11, an exciting force may occur due to an unbalanced mass of the motor 100, an unbalanced electromagnetic force of the motor 100, and the like, when the motor 100 rotates. This exciting force has a constant exciting frequency. For example, if the magnet of the stator 110 has four poles, the exciting force may have an exciting frequency corresponding to four times the rotation speed.

According to the degree of rotation of the motor 100, an exciting force having a specific exciting frequency may occur. The exciting frequency may be determined according to the driving mode of the cleaner 1 in which the motor 100 is mounted. The motor 100 may generate an exciting force having an exciting frequency within a range of 2300 hertz (Hz) or more and 5500 Hz or less depending on the driving mode of the cleaner 1. Exciting frequency may be proportional to power consumption.

For example, referring to FIG. 11, the exciting frequency may have a value of 2300 Hz or more and 3000 Hz or less in the MIN mode (power consumption of 50 W to 100 watts (W)) in which the cleaner 1 is driving in a low-speed. In the MID mode (power consumption of between 100 W and 200 W) of the cleaner 1, the exciting frequency may have a value between 3000 Hz and 4000 Hz and in the MAX-1 mode (power consumption of between 200 W and 500 W) of the cleaner 1, the exciting frequency may be more than 4000 Hz and less than 5300 Hz, and the exciting frequency may be more than 5300 Hz and less than 5500 Hz in the MAX-2 mode (power consumption of between 500 W and 550 W) of the cleaner 1.

The exciting force may have an exciting frequency in the range of 2300 Hz or more and 5500 Hz or less, and when the exciting frequency matches the natural frequency of the motor, excessive vibration occurs due to resonance, so that the natural frequency of the motor may be designed to avoid the exiting frequency in a range of 2300 Hz or more and 5500 Hz or less.

That is, the motor 100 according to an embodiment may include the cage 130 which is capable of increasing the natural frequency of the motor 100 in order to avoid the exciting frequency.

Referring to FIG. 12, motors A, B, and C including the cage according to an embodiment have increased resonance frequency are compared to a related-art general motor O.

The graph of FIG. 12 illustrates a frequency response function (FRF) according to changes in frequency. The FRF indicates acceleration of vibration for unit power.

When a force having a certain frequency is applied to the motor, excessive vibration occurs due to resonance when the frequency matches the natural frequency of the motor. Thus, the frequency that produces the relatively bouncing frequency response corresponds to the natural frequency of the motor.

According to the graph of FIG. 12, the natural frequency of the general motor O is about 2100 Hz, and the natural frequencies of the motors A, B, and C including the cage according to an embodiment are 3000 Hz or more, having a natural frequency greater than the natural frequency of the general motor O.

When the cleaner 1 is driven at high speed, the flow noise generated by the high-speed rotation of the impeller 160 is dominant, and thus, the peak noise caused by resonance of the exciting frequency and the natural frequency is difficult to be sensed by the user. However, when the cleaner 1 is driven at low speed, the flow noise of the air is small, and the peak noise caused by the resonance of the motor 100 may be sensed by the user.

Therefore, the motor according to various embodiments may have the natural frequency that is designed to avoid the exciting frequency upon low-speed driving.

The natural frequency of the motor 100 may be adjusted according to rigidity of the stator 110. That is, according to the structure of the cage which may increase rigidity of the stator 110, the natural frequency of the motor may be different.

Specifically, the rigidity of the stator 110 may be defined by the coupling force between the plurality of teeth 111 connected by the cage, the coupling force between the cage and the stator 110, or the like.

The first motor A is an embodiment which includes a first cage coupled to an upper side of the stator 110 and a second cage coupled to a lower side of the stator 110. Since the cage 230 of the first motor A is coupled to the upper and lower sides of the stator 110, respectively, the rigidity of the stator 110 may be greatly increased. The natural frequency of the first motor A is about 5802 Hz.

The second motor B is an embodiment including a cage made of one covering the entire length of the slot 116. The natural frequency of the second motor B is about 4990 Hz. The cage 430 of the second motor B is inserted into one side of the stator 110, and the second ring 435 is formed in an annular shape having a smaller circumference than the inner circumferential surface of the teeth 111, and the increase in rigidity is smaller than the first motor A. Accordingly, the natural frequency of the second motor B may be adjusted lower than the natural frequency of the first motor A.

The third motor C is an embodiment including a cage composed of one cage covering half of the entire length of the slot 116. The natural frequency of the third motor C is about 4360 Hz. The cage of the third motor C is coupled to only one side of the stator, and covers only half of the stator, and thus, the degree of increase in the rigidity of the stator 110 is smaller than that of the first motor A and the second motor B. Accordingly, the natural frequency of the third motor C may be lower than the natural frequencies of the first motor A and the second motor B. Since the natural frequency of the general motor O is 2100 Hz, there is a problem that resonance phenomenon occurs in the MIN mode where the cleaner 1 is driven at low speed, and vibration and noise are greatly generated due to the resonance phenomenon.

In order to solve this problem, the natural frequency of motors A, B, and C including the cage according to an embodiment may have a high value so as not adjacent to the exciting frequency at low speed driving. Accordingly, the resonance of the exciting frequency and the natural frequency may be avoided during the low speed driving of the cleaner 1, and vibration and noise of the motor 100 may be minimized.

Specifically, in the case of the first motor A including the cage 230 composed of the first and second cages 230a and 230b shown in FIG. 7, the natural frequency is 5802 Hz and resonance does not occur during the low-speed driving of the cleaner 1, and the vibration and noise of the motor may be minimized. Accordingly, noise generated by the cleaner 1 may be minimized.

However, in the case of the first motor A, a resonance phenomenon may occur in the MAX-2 mode in which the cleaner 1 is driven at high speed. However, since the noise due to the high speed rotation of the impeller 160 is dominant during high speed driving, the effect of the motor noise due to the resonance of the exciting frequency and the natural frequency on the user is not significant.

In the same manner, in the case of the second motor B including the cage 430 formed as shown in FIG. 10, the natural frequency is about 4990 Hz, and the case of the third motor C including one of the second cages 230a and 230b covering the half of the entire length of the slot 116 has the natural frequency of about 4360 Hz, so that resonance may be avoided in the MIN mode in which the cleaner 1 is driven at a low speed.

Accordingly, the noise caused by vibration of the motor 100 can be minimized when the cleaner 1 is driven at a low speed, in which the vibration of the motor 100 has a significant effect on user.

Figure 13:
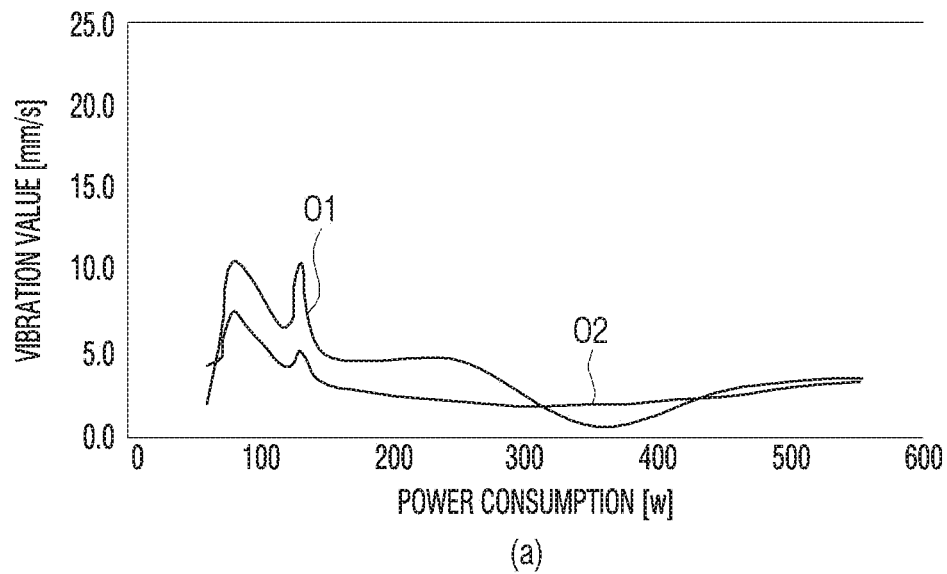
FIG. 13 illustrates graphs (a) and (b) to compare vibration of a cleaner and vibration of a general cleaner according to various embodiments of the disclosure.
Figure 13:
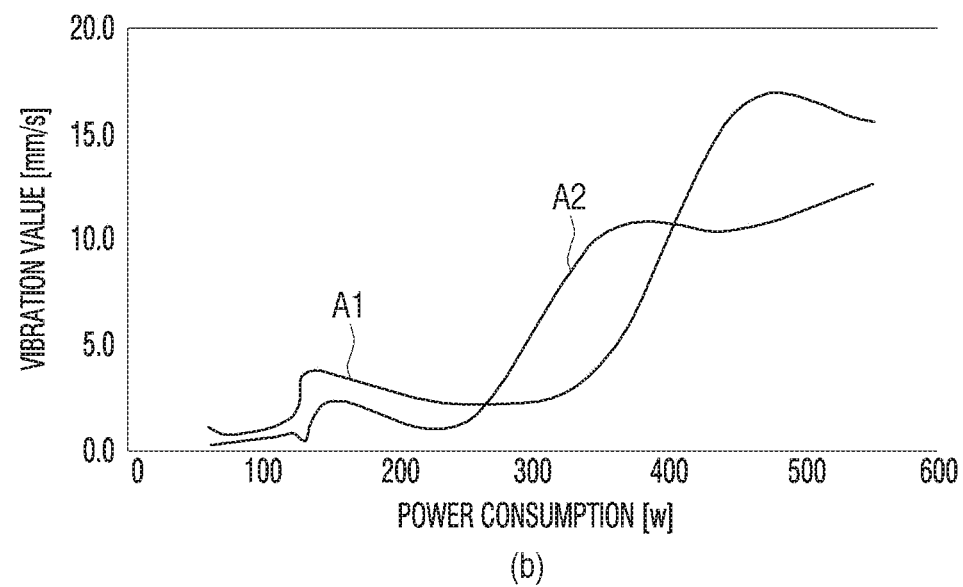

FIG. 13 illustrates graphs (a) and (b) to compare vibration of a cleaner and vibration of a general cleaner according to various embodiments of the disclosure.

Referring to graph (a) of FIG. 13, O1 indicating the degree of axial vibration of a general motor and O2 indicating the degree of radial vibration of a general motor are illustrated. In the case of a typical motor, when the cleaner is driven at a low speed (power consumption of 60 W or more and 100 W or less), the axial vibration may be about 10.0 mm/s, and the radial vibration may be about 8.0 mm/s.

Referring to graph (b) of FIG. 13, A1 indicating the axial direction vibration degree of the motor including the cage and A2 indicating the radial vibration degree of the motor including the cage are illustrated.

In the case of the motor including the cage according to an embodiment, when the cleaner is driven at low speed (power consumption of 60 W or more and 100 W or less), both the axial direction vibration and radial vibration are measured to be smaller than the vibration value of a general motor, and the axial direction vibration and radial vibration is measured close to 0.0 mm/s.

The motor 100 including a cage according to an embodiment may avoid the resonance in the low-speed driving of a cleaner in which the effect of the noise due to the resonance of the exciting frequency and the natural frequency is large on the user. During the low speed driving of the cleaner 1, resonance of the exciting frequency and the natural frequency may be avoided, thereby minimizing noise caused by the vibration of the motor 100.

While the disclosure has been shown and described with reference to various embodiments thereof, it will be understood by those skilled in the art that various changes in form and details may be made therein without departing from the spirit and scope of the disclosure as defined by the appended claims and their equivalents. The terminology used herein is for the purpose of description and should not be construed as limiting. Various modifications and variations are possible in accordance with the above teachings. Therefore, unless stated otherwise, the disclosure can be practiced freely within the scope of the claims.

What is claimed is:

1. A motor comprising:
a stator comprising:
a plurality of teeth that are spaced apart from each other in a predetermined interval in a circumferential direction, and
a coil that is wound around the plurality of teeth;
a rotor that is disposed inside the stator; and
a cage that is disposed in at least one of a plurality of slots that are formed between the plurality of teeth,
wherein the cage is configured to include a flow path to inject a bonding agent into the at least one of the plurality of slots and at least one leg fitting between extension portions of adjacent teeth of the plurality of teeth,
wherein the cage comprises:
a ring that covers one side in an axial direction of the plurality of teeth, and
the at least one leg that is extendedly formed from the ring in an insertion direction of the cage, and
wherein the at least one leg is inserted between at least two of the plurality of teeth that are adjacent to each other.

2. The motor of claim 1, wherein the flow path is formed in a region that faces the plurality of teeth.

3. The motor of claim 1, further comprising:
the bonding agent that is interposed in the flow path for coupling the plurality of teeth with the cage.

4. The motor of claim 1, wherein the flow path comprises:
an injection hole that penetrates one side of the cage;
a first coupling surface that faces one side of the plurality of teeth; and
a second coupling surface that faces a side surface of the plurality of teeth.

5. The motor of claim 4, wherein the injection hole is penetratingly formed in the ring.

6. The motor of claim 5, wherein the injection hole is formed at a position that corresponds to a position of the plurality of teeth.

7. The motor of claim 4, wherein the first coupling surface is formed at a lower end of the ring.

8. The motor of claim 4, wherein the second coupling surface is formed along a length direction of the at least one leg.

9. The motor of claim 1,
wherein the at least one leg comprises a plurality of legs, and
wherein the plurality of legs are respectively inserted into a majority of the plurality of slots.

10. The motor of claim 9,
wherein the at least one leg comprises a plurality of legs, and
wherein the plurality of legs are respectively symmetrically disposed in the plurality of slots.

11. The motor of claim 1,
wherein the at least one leg comprises a plurality of legs, and
wherein the plurality of legs are respectively inserted into all of the plurality of slots.

12. The motor of claim 1, wherein the at least one leg comprises an inclined surface that is inclined inward along an insertion direction to the stator.

13. The motor of claim 1, wherein the at least one leg comprises:
an end projection that is extendedly formed from a width of the at least one leg at an outer end portion; and an engaging protrusion that protrudes from the at least one leg at an inner end portion.

14. The motor of claim 1, wherein the cage comprises:
a first cage that is inserted to a top side of the stator; and
a second cage that is inserted to a bottom side of the stator.

15. A cleaner comprising:
a main body of a cleaner;
a suction head configured to vacuum substances from a surface to be cleaned into the main body of the cleaner; and
a motor that is disposed inside the main body of the cleaner,
wherein the motor comprises:
  a stator comprising:
    a plurality of teeth spaced apart in a predetermined interval in a circumferential direction, and
    a coil wound around the plurality of teeth;
  a rotor that is disposed inside the stator; and
    a cage that is disposed in at least one of a plurality of slots that are formed between the plurality of teeth,
wherein the cage is configured to include a flow path to inject a bonding agent into the at least one of the plurality of slots and at least one leg fitting between extension portions of adjacent teeth of the plurality of teeth,
wherein the cage comprises:
  a ring that covers one side in an axial direction of the plurality of teeth, and
  the at least one leg that is extendedly formed from the ring in an insertion direction of the cage, and
wherein the at least one leg is inserted between at least two of the plurality of teeth that are adjacent to each other.

16. The cleaner of claim 15, wherein the flow path comprises:
an injection hole that penetrates one side of the cage;
a first coupling surface that faces one side of the plurality of teeth; and
a second coupling surface that faces a side surface of the plurality of teeth.

17. A method for manufacturing a motor including a rotor and a stator, the method comprising:
winding a coil around a plurality of teeth that are spaced apart from each other in a predetermined interval in a circumferential direction;
coupling at least one leg of a cage, that is fit on extension portions of adjacent teeth of the plurality of teeth, to the stator; and
disposing a rotor configured to be rotatable inside of the stator,
wherein the coupling of the cage to the stator comprises:
  injecting a bonding agent into at least one of a plurality of slots formed between the plurality of teeth through a flow path that is formed in the cage,
wherein the cage comprises a ring that covers one side of an axial direction of the plurality of teeth and the at least one leg that is extendedly formed in an insertion direction of the cage from the ring,
wherein the ring is bonded with one side in an axial direction of the plurality of teeth, and
wherein the leg is bonded with another side of the plurality of teeth.

18. The method for manufacturing a motor of claim 17, wherein the flow path comprises:
an injection hole that penetrates the ring;
a first coupling surface formed in the ring; and
a second coupling surface that is connected to the first coupling surface and formed on one side surface of the leg.

* * * * *